United States Patent
Li

(10) Patent No.: US 11,924,744 B2
(45) Date of Patent: Mar. 5, 2024

(54) ACCESS CONTROL BARRING METHOD AND DEVICE

(71) Applicant: BEIJING XIAOMI MOBILE SOFTWARE CO., LTD., Beijing (CN)

(72) Inventor: Yanhua Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 508 days.

(21) Appl. No.: 17/270,420

(22) PCT Filed: Aug. 29, 2018

(86) PCT No.: PCT/CN2018/102941
§ 371 (c)(1),
(2) Date: Feb. 22, 2021

(87) PCT Pub. No.: WO2020/042009
PCT Pub. Date: Mar. 5, 2020

(65) Prior Publication Data
US 2021/0185593 A1     Jun. 17, 2021

(51) Int. Cl.
*H04W 48/08* (2009.01)
*H04B 17/327* (2015.01)
*H04W 24/08* (2009.01)
*H04W 28/02* (2009.01)
*H04W 48/16* (2009.01)

(52) U.S. Cl.
CPC .......... *H04W 48/08* (2013.01); *H04B 17/327* (2015.01); *H04W 24/08* (2013.01); *H04W 28/0221* (2013.01); *H04W 48/16* (2013.01)

(58) Field of Classification Search
CPC . H04W 48/08; H04W 24/08; H04W 28/0221; H04W 48/16; H04W 48/04; H04B 17/327
See application file for complete search history.

(56) References Cited

U.S. PATENT DOCUMENTS

| | | | |
|---|---|---|---|
| 8,738,075 B2 | 5/2014 | Zhang et al. | |
| 8,948,751 B2 | 2/2015 | Zhang et al. | |
| 9,210,650 B2 | 12/2015 | Mao et al. | |
| 9,338,736 B2 | 5/2016 | Zhang et al. | |
| 2013/0331099 A1* | 12/2013 | Iwamura | H04W 48/02 455/434 |
| 2014/0370890 A1 | 12/2014 | Huang et al. | |

(Continued)

FOREIGN PATENT DOCUMENTS

| | | |
|---|---|---|
| CN | 102612112 A | 7/2012 |
| CN | 103220749 A | 7/2013 |
| CN | 103733688 A | 4/2014 |

(Continued)

OTHER PUBLICATIONS

International Search Report to PCT/CN2018/102941 dated May 30, 2019 with English translation, (4p).

*Primary Examiner* — Mohammed Waliullah
(74) *Attorney, Agent, or Firm* — Arch & Lake LLP

(57) ABSTRACT

The present application provides an access control barring method and device. The method is applied to a terminal, and the method includes: determining a designated call type barring for an access control barring; and performing the access control barring based on the designated call type barring.

18 Claims, 4 Drawing Sheets

--- determining a designated call type barring for an access control barring — 110 performing the access control barring based on the designated call type barring — 120

(56) References Cited

U.S. PATENT DOCUMENTS

2015/0208334 A1* 7/2015 Zhang .................. H04W 48/16
                                                              455/434
2019/0174395 A1* 6/2019 Choe .................... H04W 72/56

FOREIGN PATENT DOCUMENTS

WO        2012146101 A1   11/2012
WO   WO-2017023307 A1 *  2/2017            G06F 15/16

* cited by examiner

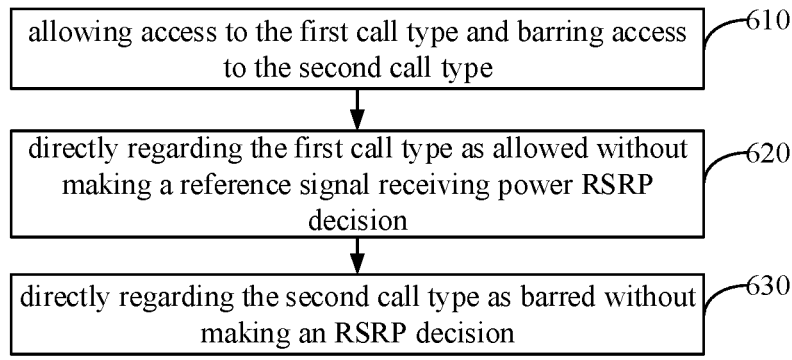
FIG. 6
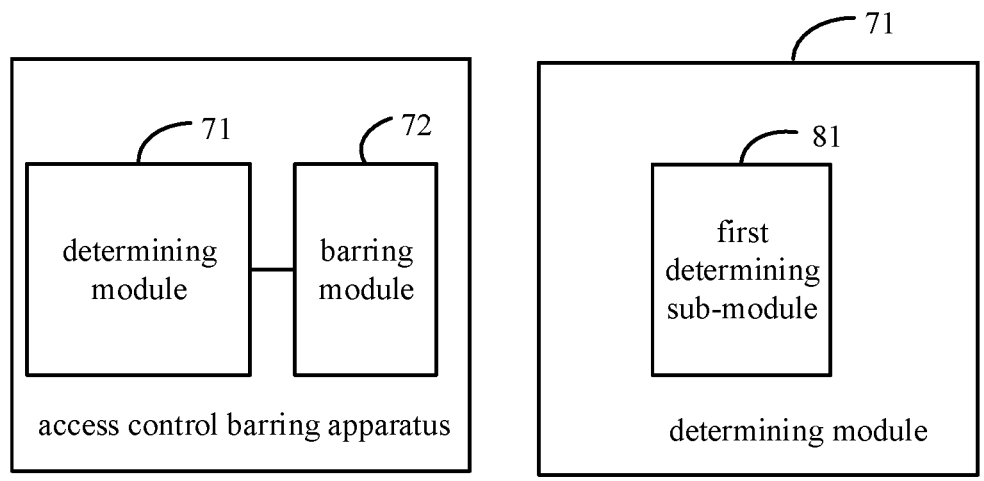
FIG. 7
FIG. 8
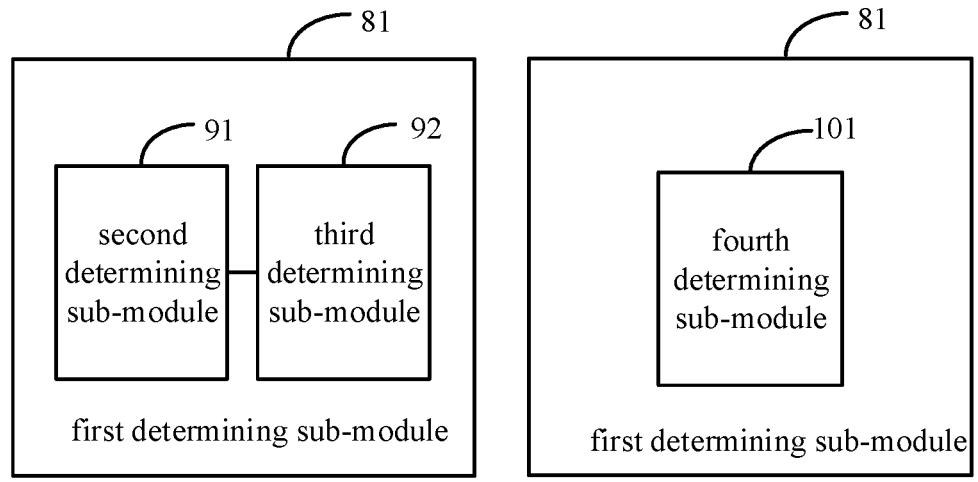
FIG. 9
FIG. 10

ACCESS CONTROL BARRING METHOD AND DEVICE

CROSS-REFERENCE TO RELATED APPLICATION

This application is the US national application of International Application No. PCT/CN2018/102941, filed on Aug. 29, 2018, the entire contents of which are incorporated herein by reference for all purposes.

TECHNICAL FIELD

The disclosure relates to a field of communication technology, and more particularly, to an access control barring method and an access control barring apparatus.

BACKGROUND

In the Long Term Evolution (LTE) communication system, the working mechanism for barring Access Control (AC) is that, the corresponding AC barring parameters are obtained based on the terminal's access class and the call type initiated by the terminal, to perform an AC barring check.

The AC barring mechanism has also been introduced to enhanced coverage scenarios for Narrow Band Internet of Things (NB-IOT) and enhanced Machine Type of Communication (eMTC). However, there is no optimized solution for performing the AC barring for the enhanced coverage scenarios.

SUMMARY

According to an example of the disclosure, an access control barring method is provided. The method may be applied to a terminal and the method may include determining a designated call type barring for an access control barring and performing the access control barring based on the designated call type barring.

According to another example of the disclosure, a non-transitory computer-readable storage medium having a computer program stored thereon is provided. The computer program may be configured to perform determining a designated call type barring for an access control barring, and performing and the access control barring based on the designated call type barring.

According to a further example of the disclosure, an access control barring device is provided. The device may be applied to a terminal and the device may include a processor and a memory for storing instructions executable by the processor. The processor may be configured to determine a designated call type barring for an access control barring and perform the access control barring based on the designated call type barring.

It should be understood that the above general description and the following detailed description are only exemplary and explanatory, without any limitations to the disclosure.

BRIEF DESCRIPTION OF THE DRAWINGS

The drawings herein are incorporated into the specification and constitute a part of the specification, show examples in accordance with the disclosure, and are used to explain the principle of the disclosure together with the specification.

FIG. 6 is a flowchart illustrating another access control barring method according to an example.

FIG. 7 is a block diagram illustrating an access control barring apparatus according to an example.

FIG. 8 is a block diagram illustrating another access control barring apparatus according to an example.

FIG. 9 is a block diagram illustrating another access control barring apparatus according to an example.

FIG. 10 is a block diagram illustrating another access control barring apparatus according to an example.

DETAILED DESCRIPTION

The examples will be described in detail here, and examples thereof are illustrated in the accompanying drawings. When the following descriptions refer to the accompanying drawings, unless otherwise indicated, the same numbers in different drawings represent the same or similar elements. The implementations described in the following examples do not represent all implementations consistent with the disclosure. Rather, they are merely apparatuses and methods consistent with some aspects of the disclosure.

The terms used in the disclosure are only aimed to describe examples, and are not intended to limit the disclosure. The singular forms "a", "said" and "the" used in the disclosure and appended claims are also intended to include plural forms, unless the context clearly indicates other meanings. It should also be understood that the term "and/or" used herein refers to and includes any or all possible combinations of one or more associated listed items.

It should be understood that although the terms such as first, second and third may be used in the disclosure to describe various information, the information should not be limited to these terms. These terms are only used to distinguish the same type of information from each other. For example, without departing from the scope of the disclosure, the instruction information may also be referred to as a second information, and similarly, the second information may also be referred to as an instruction information. Depending on the context, the word "if" as used herein may be interpreted as "when . . . " or "upon . . . " or "in response to determine . . . ".

Figure 1:
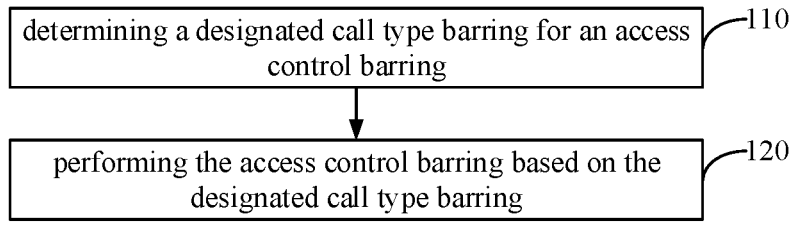
FIG. 1 is a flowchart illustrating an access control barring method according to an example.
Figure 2:
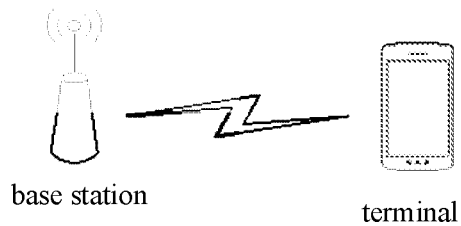
FIG. 2 is an application scenario diagram illustrating an access control barring method according to an example.

FIG. 1 is a flowchart illustrating an access control barring method according to an example, and FIG. 2 is an application scenario diagram illustrating an access control barring method according to an example; the access control barring method may be applied to a terminal that may be a UE (user equipment); as illustrated in FIG. 1, the access control barring method may include the following blocks 110-120.

In block 110, a designated call type barring for an access control barring is determined.

In the new generation communication system, the AC barring mechanism is introduced for enhanced coverage scenarios such as NB-IOT and eMTC, having a purpose of barring the users with enhanced coverage at the edge of the cell. In addition, the AC barring mechanism in the enhanced coverage scenarios is barred from coverage enhancement levels.

Since the division of coverage enhancement levels is related to RSRP (reference signal received power), it may be understood that the AC barring mechanism in the enhanced coverage scenarios is barred from a certain RSRP threshold. In other words, in case that the RSRP for the terminal is lower than the RSRP threshold, the terminal may be barred. In order to optimize the AC barring mechanism for enhanced coverage scenarios, a finer AC barring granularity also needs to be considered in the disclosure when barring from a certain RSRP threshold. That is, a designated call type barring is added to the AC barring mechanism in enhanced coverage scenarios.

In the examples of the disclosure, determining the designated call type barring may refer to determining which call types are the ones allowed to access and which call types are the ones barred to access.

In an example, the designated call type barring may include a first call type that is allowed to access and/or a second call type that is barred to access. In other words, the designated call type barring may be any one of the following cases.

Case 1: the designated call type barring includes a first call type.

Case 2: the designated call type barring includes a second call type.

Case 3: the designated call type barring includes the first call type and the second call type.

In an example, the first call type and/or the second call type may be determined based on at least one of the following (1-1), (1-2) and (1-3).

(1-1) a designated call type.
(1-2) a designated access class.
(1-3) barring all call types.

In the above (1-1), the first call type may be determined based on the first designated call type, and the second call type may be determined based on the second designated call type. For example, the first designated call type is an originating signaling, and the second designated call type is originating calls.

In the above (1-2), the designated access class may be AC0-9 or AC11-15. The AC0-9 may be used for ordinary users, and AC11-15 may be used for high-priority users.

In the above (1-3), barring all call types may means that all call types will be set to the second call type barred. That is, there is no first call type allowed to access.

In block 120, the access control barring is performed based on the designated call type barring.

In the examples of the disclosure, the designated call type barring may only include the first call type or the second call type, or may also include both the first call type and the second call type. Therefore, the terminal may perform the corresponding access control barring according to different content included in the designated call type barring.

In an example scenario, as illustrated in FIG. 2, a base station and a terminal are included.

In the enhanced coverage scenarios such as NB-IOT or eMTC, when the access control is barred by the terminal, the designated call type barring for the access control barring may be first determined, and the access control barring is performed based on the designated call type barring. In other words, the corresponding access control barring may be performed based on different content included in the designated call type barring.

It can be seen from the above example that the designated call type barring for the access control barring may be first determined, and the access control barring is performed based on the designated call type barring, so that the designated call type barring may be added to the access control barring mechanism for the enhanced coverage scenarios, thereby refining the access control barring granularity and improving the access control barring accuracy.

Figure 3:
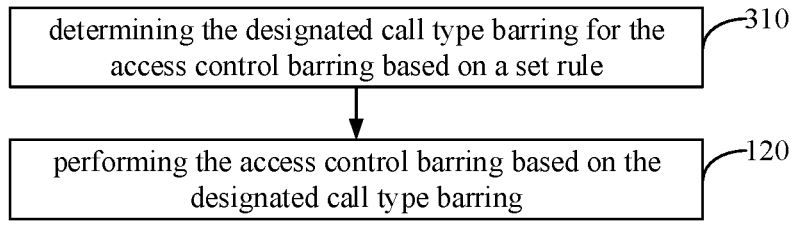
FIG. 3 is a flowchart illustrating another access control barring method according to an example.

FIG. 3 is a flowchart illustrating another access control barring method according to an example. The access control barring method may be applied to a terminal and established based on the method illustrated in FIG. 1, when block 110 is performed, the following block 310 may be included as illustrated in FIG. 3.

In block 310, the designated call type barring for the access control barring is determined based on a set rule.

In the example of the disclosure, the set rule may be a rule for determining the designated call type barring for the access control barring. In other words, the terminal may determine which call types are the ones allowed to access and which call types are the ones barred to access based on the set rule. In addition, there are many ways to obtain the set rule, including but not limited to the following three manners.

Manner 1: the set rule is specified in a communication protocol or written in the terminal in a form of firmware.

Manner 2: the set rule is notified by a base station to the terminal through a system message or dedicated signaling. In an example, the dedicated signaling may include a signaling for notifying the terminal to be suspended, such as an RRC (Radio Resource Control) connection release message.

In the Manner 2, when block 310 is performed, it may include the following (2-1) and (2-2).

(2-1) when the set rule is included in the dedicated signaling, it is determined by the terminal that the designated call type barring for the access control barring based on the set rule included in the dedicated signaling.

(2-2) when the set rule is not included in the dedicated signaling, it is determined by the terminal that the designated call type barring for the access control barring based on the set rule included in the system message.

Manner 3: In addition to the content in the Manner 2, the system message or dedicated signaling may also include an effective time and/or effective area using the set rule.

In the Manner 3, when block 310 is performed, it may include the following (3-1).

(3-1) the designated call type barring for the access control barring is determined based on the set rule within the effective time and/or effective area of the set rule.

In the example of the disclosure, the effective time may be agreed by the system or configured by the network, for example, within 300 seconds. The effective area may also be agreed by the system or configured by the network. If the effective area is agreed by the system, it may only be limited to the cell and/or RAN-based Notification Area and/or tracking area when the connection is released; and if the effective area is configured by the network, a list of cells and/or RAN-based notification areas and/or tracking areas may be configured. RAN is the abbreviation of Radio Access Network.

It can be seen from the above example that the designated call type barring for the access control barring may be determined based on the set rule, and the access control barring is performed based on the designated call type barring, thereby improving the reliability of determining the designated call type barring.

Figure 4:
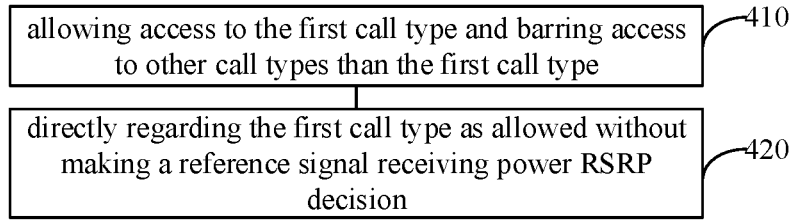
FIG. 4 is a flowchart illustrating another access control barring method according to an example.

FIG. 4 is a flowchart illustrating another access control barring method according to an example. The access control barring method may be applied to a terminal and established based on the method illustrated in FIG. 1. The designated call type barring includes one or more first call types that are allowed to access; and when block 120 is performed, the following block 410 may be included as illustrated in FIG. 4.

In block 410, access to the first call type is allowed and access to other call types than the first call type is barred.

In an example, after performing the above block 410, the following block 420 may be also included.

In block 420, the first call type is directly regarded as allowed without making a reference signal receiving power RSRP check.

In the example of the disclosure, since the first call type is a call type that is allowed to access, it is directly regarded as allowed without making subsequent RSRP check.

It can be seen from the above example that access to the first call type may be allowed and access to other call types than the first call type may be barred, and the first call type is directly regarded as allowed without making the RSRP check, thereby improving the access control barring accuracy and efficiency.

Figure 5:
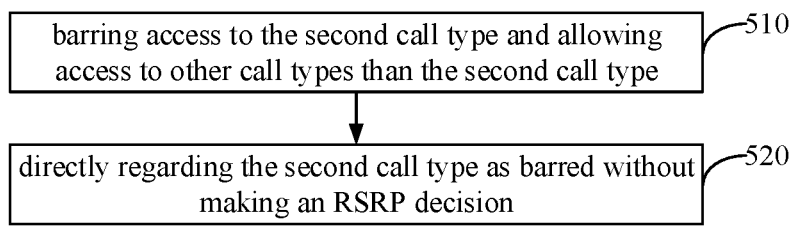
FIG. 5 is a flowchart illustrating another access control barring method according to an example.

FIG. 5 is a flowchart illustrating another access control barring method according to an example. The access control barring method may be applied to a terminal and established based on the method illustrated in FIG. 1. The designated call type barring includes one or more second call types that are barred to access; and when block 120 is performed, the following block 510 may be included as illustrated in FIG. 5.

In block 510, access to the second call type is barred, and access to other call types than the second call type is allowed.

In an example, after performing the above block 510, the following block 520 may be also included.

In block 520, the second call type is directly regarded as barred without making an RSRP check.

In the example of the disclosure, since the second call type is a call type that is barred to access, it is directly regarded as barred without making subsequent RSRP check.

It can be seen from the above example that access to the second call type may be barred and access to other call types than the second call type may be allowed, and the second call type is directly regarded as barred without making the RSRP check, thereby improving the access control barring accuracy and efficiency.

FIG. 6 is a flowchart illustrating another access control barring method according to an example. The access control barring method may be applied to a terminal and established based on the method illustrated in FIG. 1. The designated call type barring includes one or more first call types that are allowed to access and one or more second call types that are barred to access; and when block 120 is performed, the following block 610 may be included as illustrated in FIG. 6.

In block 610, access to the first call type is allowed and access to the second call type is barred.

In an example, after performing the above block 610, the following blocks 620-630 may be also included.

In block 620, the first call type is directly regarded as allowed without making a reference signal receiving power RSRP check.

In the example of the disclosure, since the first call type is a call type that is allowed to access, the first call type is directly regarded as allowed without making subsequent RSRP check.

In block 630, the second call type is directly regarded as barred without making an RSRP check.

In the example of the disclosure, since the second call type is a call type that is barred to access, the second call type is directly regarded as barred without making subsequent RSRP check.

It can be seen from the above example that access to the first call type may be allowed and access to the second call type may be barred. The first call type is directly regarded as allowed without making the RSRP check, and the second call type is directly regarded as barred without making the RSRP check, thereby improving the access control barring accuracy and efficiency.

Corresponding to the above example of the access control barring methods, the disclosure also provides examples of the access control barring apparatuses.

FIG. 7 is a block diagram illustrating an access control barring apparatus according to an example. The apparatus is applied to a terminal and configured to execute the access control barring method illustrated in FIG. 1. As illustrated in FIG. 7, the access control barring apparatus may include a determining module 71 and a barring module 72.

The determining module 71 is configured to determine a designated call type barring for an access control barring.

The barring module 72 is configured to perform the access control barring based on the designated call type barring.

It can be seen from the above example that the designated call type barring for the access control barring may be first determined, and the access control may be barred based on the designated call type barring, so that the designated call type barring may be added to the access control barring mechanism for the enhanced coverage scenarios, thereby refining the access control barring granularity and improving the access control barring accuracy.

In an example, based on the apparatus illustrated in FIG. 7, the designated call type barring includes the first call type that is allowed to access and/or the second call type that is barred to access.

In an example, the first call type and/or the second call type may be determined based on at least one of the following (1-1), (1-2) and (1-3).

(1-1) a designated call type.
(1-2) a designated access class.
(1-3) barring all call types.

In an example, based on the apparatus illustrated in FIG. 7, the determining module 71 may include a first determining sub-module 81 as illustrated in FIG. 8.

The first determining sub-module 81 is configured to determine the designated call type barring for the access control barring based on the set rule.

It can be seen from the above example that the designated call type barring for the access control barring may be determined based on the set rule, and the access control barring is performed based on the designated call type barring, thereby improving the reliability of determining the designated call type barring.

In an example, based on the apparatus illustrated in FIG. 8, the set rule is specified in a communication protocol or written in the terminal in a form of firmware.

In an example, based on the apparatus illustrated in FIG. 8, the set rule is notified by a base station to the terminal through a system message or dedicated signaling; and the first determining sub-module 81 may include a second determining sub-module 91 and a third determining sub-module 92 as illustrated in FIG. 9.

when the set rule is included in the dedicated signaling, the second determining sub-module 91 is configured to determine by the terminal designated call type barring for the access control barring based on the set rule included in the dedicated signaling.

when the set rule is not included in the dedicated signaling, the third determining sub-module 92 is configured to determine by the terminal the designated call type barring for the access control barring based on the set rule included in the system message.

In an example, based on the apparatus illustrated in FIG. 9, the system message or dedicated signaling also includes an effective time and/or effective area using the set rule; and the first determining sub-module 81 includes a fourth determining sub-module 101 as illustrated in FIG. 10.

The fourth determining sub-module 101 is configured to determine the designated call type barring for the access control barring based on the set rule within the effective time and/or effective area of the set rule.

In an example, based on the apparatus illustrated in FIG. 9 or FIG. 10, the dedicated signaling may include a message for notifying the terminal to be suspended.

Figure 11:
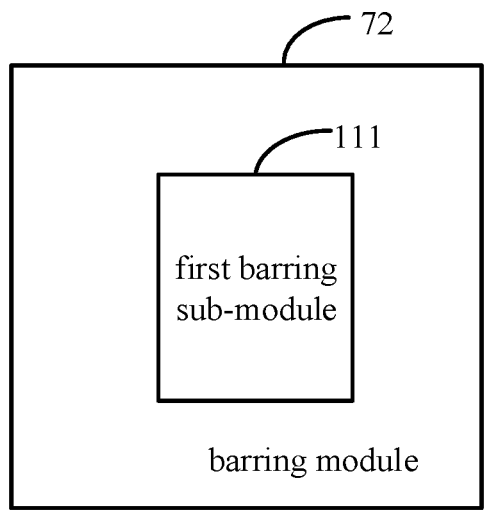
FIG. 11 is a block diagram illustrating another access control barring apparatus according to an example.

In an example, based on the apparatus illustrated in FIG. 7, the designated call type barring includes one or more first call types that are allowed to access; and the barring module 72 may include a first barring sub-module 111 as illustrated in FIG. 11.

The first barring sub-module 111 is configured to allow access to the first call type and bar access to other call types than the first call type.

It can be seen from the above example that access to the first call type may be allowed and access to other call types than the first call type may be barred, and the first call type is directly regarded as allowed without making the RSRP check, thereby improving the access control barring accuracy and efficiency.

Figure 12:
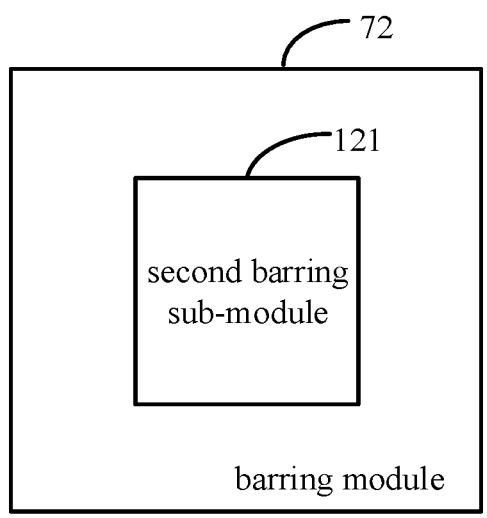
FIG. 12 is a block diagram illustrating another access control barring apparatus according to an example.

In an example, based on the apparatus illustrated in FIG. 7, the designated call type barring includes one or more second call types that are barred to access; and the barring module 72 may include a second barring sub-module 121 as illustrated in FIG. 12.

The second barring sub-module 121 is configured to bar access to the second call type and allow access to other call types than the second call type.

It can be seen from the above example that access to the second call type may be barred and access to other call types than the second call type may be allowed, and the second call type is directly regarded as barred without making the RSRP check, thereby improving the access control barring accuracy and efficiency.

Figure 13:
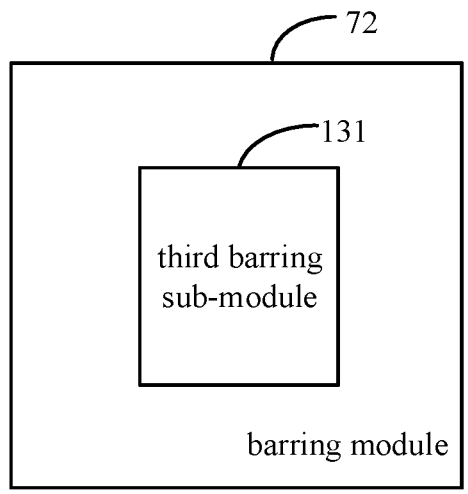
FIG. 13 is a block diagram illustrating another access control barring apparatus according to an example.

In an example, based on the apparatus illustrated in FIG. 7, the designated call type barring includes one or more first call types that are allowed to access and one or more second call types that are barred to access; and the barring module 72 may include a third barring sub-module 131 as illustrated in FIG. 13.

The third barring sub-module 131 is configured to allow access to the first call type and bar access to the second call type.

It can be seen from the above example that access to the first call type may be allowed and access to the second call type may be barred. The first call type is directly regarded as allowed without making the RSRP check, and the second call type is directly regarded as barred without making the RSRP check, thereby improving the access control barring accuracy and efficiency.

Figure 14:
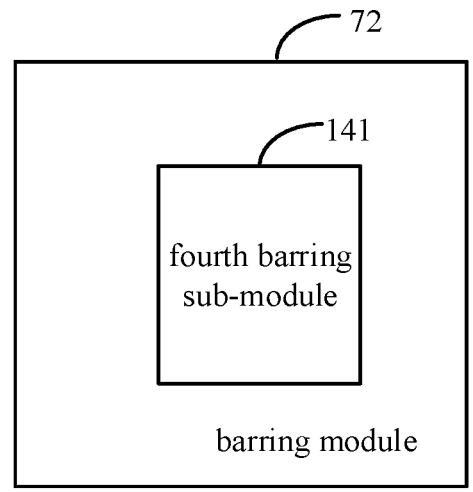
FIG. 14 is a block diagram illustrating another access control barring apparatus according to an example.

In an example, based on the apparatus illustrated in FIG. 11 or FIG. 13, the barring module 72 may further include a fourth barring sub-module 141 as illustrated in FIG. 14.

The fourth barring sub-module 141 is configured to directly regard the first call type as allowed without making a reference signal receiving power RSRP check.

Figure 15:
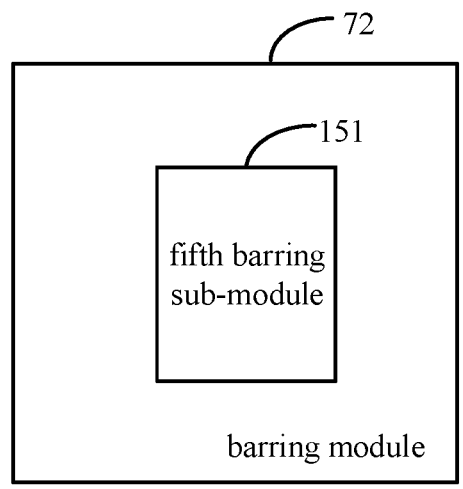
FIG. 15 is a block diagram illustrating another access control barring apparatus according to an example.

In an example, based on the apparatus illustrated in FIG. 12 or FIG. 13, the barring module 72 may further include a fifth barring sub-module 151 as illustrated in FIG. 15

The fifth barring sub-module 151 is configured to directly regard the second call type as barred without making an RSRP check.

As for the apparatus examples that basically correspond to the method examples, the relevant parts may refer to the descriptions on parts of the method examples. The apparatus examples described above are merely illustrative. The units described above as separate components may or may not be physically separated, and the components displayed as units may or may not be physical units, that is, they may be located in one place or may be distributed to multiple network units. Some or all of the modules can be selected according to actual needs to achieve the objectives of the solutions of the disclosure. Those skilled in the art may understand and implement them without creative work.

The disclosure also provides a non-transitory computer-readable storage medium on which a computer program is stored, and the computer program is configured to execute the access control barring method described in any one of FIG. 1 to FIG. 6.

The disclosure also provides an access control barring device. The device is applied to a terminal and includes:
a processor;
a memory for storing instructions executable by the processor;
wherein the processor is configured to
determine a designated call type barring for the access control barring; and
perform the access control barring based on the designated call type barring.

Figure 16:
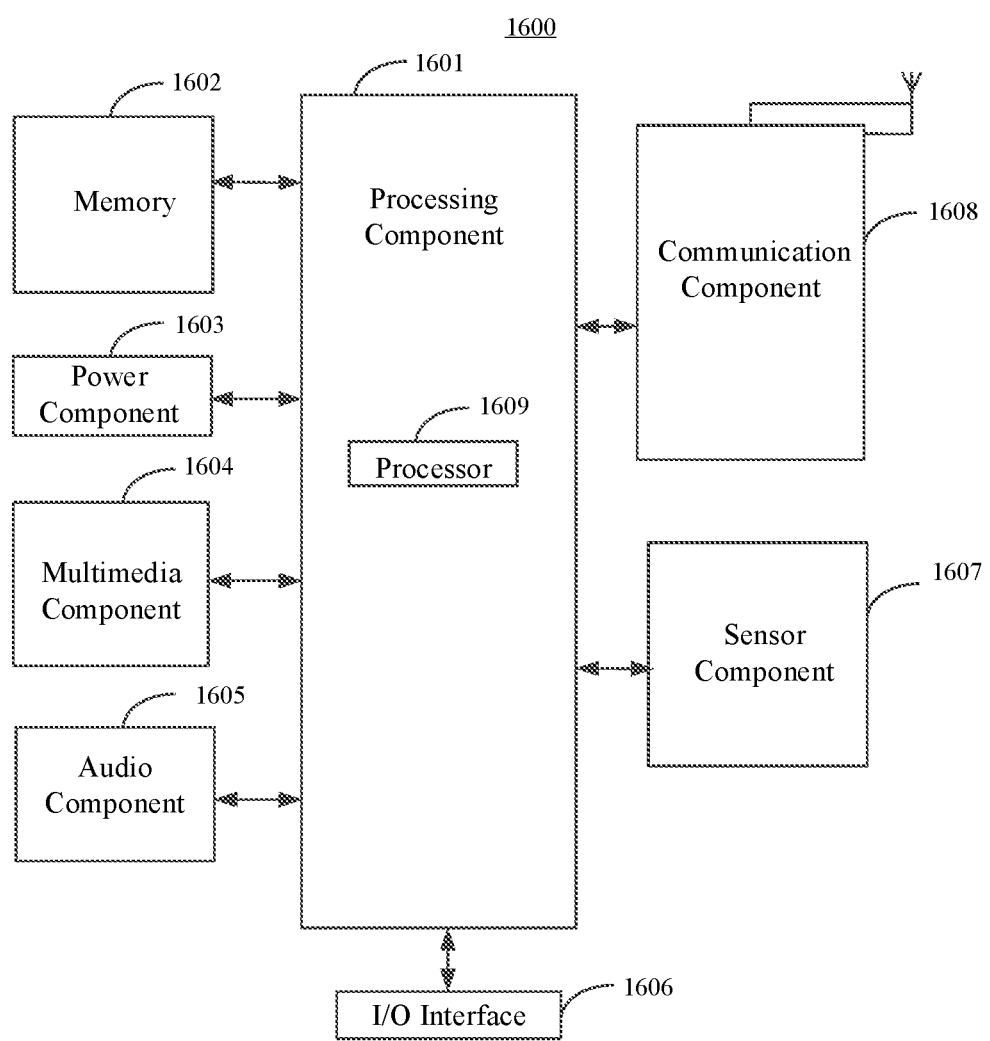
FIG. 16 is a structural schematic diagram illustrating an access control barring device according to an example.

FIG. 16 is a structural schematic diagram illustrating an access control barring device according to an example. As illustrated in FIG. 16, an access control barring device 1600 is illustrated according to an example. The device 1600 may be a computer, a mobile phone, a digital broadcasting terminal, a messaging device, a game console, a tablet device, a medical device, a fitness equipment, a personal digital assistant and other terminals.

Referring to FIG. 16, the device 1600 may include one or more of the following components: a processing component 1601, a memory 1602, a power supply component 1603, a multimedia component 1604, an audio component 1605, an input/output (I/O) interface 1606, a sensor component 1607, and a communication component 1608.

The processing component 1601 typically controls the overall operations of the device 1600, such as the operations associated with display, telephone calls, data communications, camera operations, and recording operations. The processing component 1601 may include one or more processors 1609 to execute instructions to perform all or part of the steps of the above described methods. Moreover, the processing component 1601 may include one or more modules which facilitate the interaction between the processing component 1601 and other components. For example, the processing component 1601 may include a multimedia module to facilitate the interaction between the multimedia component 1604 and the processing component 1601.

The memory 1602 is configured to store various types of data to support operations in the device 1600. Examples of such data include instructions for any application or method operating on the device 1600, contact data, phone book data, messages, pictures, videos, etc. The memory 1602 may be implemented by any type of volatile or nonvolatile storage device or a combination thereof, such as a static random access memory (SRAM), an electrically erasable programmable read-only memory (EEPROM), an erasable programmable read only memory (EPROM), a programmable read only memory (PROM), a read only memory (ROM), a magnetic memory, a flash memory, a magnetic or optical disk.

The power supply component 1603 provides power to various components of the device 1600. The power supply component 1603 may include a power management system, one or more power sources, and other components associated with the generation, management, and distribution of power for the device 1600.

The multimedia component 1604 includes a screen that provides an output interface between the device 1600 and the user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensors may not only sense a boundary of the touch or slide action, but also sense a period of time and a pressure associated with the touch or swipe action. In some examples, the multimedia component 1604 includes a front camera and/or a rear camera. The front camera and the rear camera may receive an external multimedia datum while the device 1600 is in an operation mode, such as a photographing mode or a video mode. Each of the front camera and rear camera may be a fixed optical lens system or have focus and optical zoom capability.

The audio component 1605 is configured to output and/or input audio signals. For example, the audio component 1605 includes a microphone (MIC) configured to receive an external audio signal when the device 1600 is in an operation mode, such as a call mode, a recording mode, and a voice recognition mode. The received audio signal may be further stored in the memory 1602 or transmitted via the communication component 1608. In some examples, the audio component 1605 further includes a speaker to output audio signals.

The I/O interface 1606 provides an interface between the processing component 1601 and the peripheral interface module. The peripheral interface module may be a keyboard, a click wheel, a button, and the like. These buttons may include but are not limited to, a home button, a volume button, a starting button, and a locking button.

The sensor component 1607 includes one or more sensors for providing the device 1600 with various aspects of state evaluation. For example, the sensor component 1607 may detect an open/closed status of the device 1600, relative positioning of components, e.g., the display and the keypad, of the device 1600, a change in position of the device 1600 or a component of the device 1600, a presence or absence of user contact with the device 1600, an orientation or an acceleration/deceleration of the device 1600, and a change in temperature of the device 1600. The sensor component 1607 may include a proximity sensor configured to detect the presence of nearby objects without any physical contact. The sensor component 1607 may also include a light sensor, such as a CMOS or CCD image sensor, for use in imaging applications. In some examples, the sensor component 1607 may also include an accelerometer sensor, a gyroscope sensor, a magnetic sensor, a pressure sensor, or a temperature sensor.

The communication component 1608 is configured to facilitate communication, wired or wirelessly, between the device 1600 and other devices. The device 1600 may access a wireless network based on a communication standard, such as WiFi, 2G or 3G, or a combination thereof. In one example, the communication component 1608 receives a broadcast signal or broadcast associated information from an external broadcast management system via a broadcast channel. In one example, the communication component 1608 further includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology, and other technologies.

In an example, the device 1600 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic elements, for implementing the above methods.

In examples, there is also provided a non-transitory computer-readable storage medium including instructions, such as the memory 1602, executable by the processor 1609 in the device 1600, for performing the above-described methods. For example, the non-transitory computer-readable storage medium may be a ROM, a RAM, a CD-ROM, a magnetic tape, a floppy disc, an optical data storage device, and the like.

When the instructions in the storage medium are executed by the processor, the device 1600 is caused to execute any one of the access control barring methods described above.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

It will be appreciated that the present invention is not limited to the exact construction that has been described above and illustrated in the accompanying drawings, and that various modifications and changes can be made without departing from the scope thereof.

What is claimed is:

1. An access control barring method, applied to a terminal, the method comprising:
   determining a designated call type barring for an access control barring based on a set rule, wherein the set rule is notified by a base station to the terminal through a system message or dedicated signaling; and
   performing the access control barring based on the designated call type barring;
   wherein determining the designated call type barring for the access control barring based on the set rule comprises:
   when the set rule is included in the dedicated signaling, determining by the terminal the designated call type barring for the access control barring based on the set rule included in the dedicated signaling; and
   when the set rule is not included in the dedicated signaling, determining by the terminal the designated call type barring for the access control barring based on the set rule included in the system message.

2. The method of claim 1, wherein the designated call type barring comprises a first call type that is allowed to access and/or a second call type that is barred to access.

3. The method of claim 2, wherein the first call type and/or the second call type are determined based on at least one of:
   a designated call type;
   a designated access class; and
   barring all call types.

4. The method of claim 1, wherein the set rule is specified in a communication protocol or written in the terminal in a form of firmware.

5. The method of claim 1, wherein:
   the system message or dedicated signaling further comprises an effective time and/or effective area using the set rule; and
   determining the designated call type barring for the access control barring based on the set rule comprises:
   determining the designated call type barring for the access control barring based on the set rule within the effective time and/or effective area of the set rule.

6. The method of claim 1, wherein the dedicated signaling comprises a message for notifying the terminal to be suspended.

7. The method of claim 1, wherein:
   the designated call type barring comprises one or more first call types that are allowed to access; and
   performing the access control barring based on the designated call type barring comprises:
   allowing access to the first call type and barring access to other call types than the first call type.

8. The method of claim 1, wherein:
   the designated call type barring comprises one or more second call types that are barred to access; and
   performing the access control barring based on the designated call type barring comprises:
   barring access to the second call type and allowing access to other call types than the second call type.

9. The method of claim 1, wherein:
   the designated call type barring comprises one or more first call types that are allowed to access, and one or more second call types that are barred to access; and
   performing the access control barring based on the designated call type barring comprises:
   allowing access to the first call type and barring access to the second call type.

10. The method of claim 7, wherein performing the access control barring based on the designated call type barring further comprises:
    directly regarding the first call type as allowed without making a reference signal receiving power RSRP check.

11. The method of claim 8, wherein performing the access control barring based on the designated call type barring further comprises:
    directly regarding the second call type as barred without making an RSRP check.

12. A non-transitory computer-readable storage medium having a computer program stored thereon, wherein the computer program is configured to execute the access control barring method to perform
    determining a designated call type barring for an access control barring based on a set rule, wherein the set rule is notified by a base station to the terminal through a system message or dedicated signaling; and
    performing the access control barring based on the designated call type barring;
    wherein determining the designated call type barring for the access control barring based on the set rule comprises:
    when the set rule is included in the dedicated signaling, determining the designated call type barring for the access control barring based on the set rule included in the dedicated signaling; and
    when the set rule is not included in the dedicated signaling, determining the designated call type barring for the access control barring based on the set rule included in the system message.

13. An access control barring device, applied to a terminal, comprising:
    a processor; and
    a memory for storing instructions executable by the processor;
    wherein the processor is configured to:
    determine a designated call type barring for an access control barring based on a set rule, wherein the set rule is notified by a base station to the terminal through a system message or dedicated signaling; and
    perform the access control barring based on the designated call type barring;
    wherein the processor is further configured to:
    when the set rule is included in the dedicated signaling, determine the designated call type barring for the access control barring based on the set rule included in the dedicated signaling; and
    when the set rule is not included in the dedicated signaling, determine the designated call type barring for the access control barring based on the set rule included in the system message.

14. The device of claim 13, wherein:
    the designated call type barring comprises a first call type that is allowed to access and/or a second call type that is barred to access; and
    the first call type and/or the second call type are determined based on at least one of a designated call type; a designated access class; and barring all call types.

15. The device of claim 13, wherein
the set rule is specified in a communication protocol or written in the terminal in a form of firmware and the dedicated signaling comprises a message for notifying the terminal to be suspended.

16. The device of claim 15, wherein:
the system message or dedicated signaling further comprises an effective time and/or effective area using the set rule; and
the processor is further configured to determine the designated call type barring for the access control barring based on the set rule within the effective time and/or effective area of the set rule.

17. The device of claim 13, wherein:
the designated call type barring comprises one or more first call types that are allowed to access and/or one or more second call types that are barred to access; and
the processor is further configured to allow access to the first call type and bar access to second call types.

18. The device of claim 17, wherein the processor is further configured to:
directly regard the first call type as allowed without making a reference signal receiving power RSRP check; or
directly regard the second call type as barred without making an RSRP check.

\* \* \* \* \*